(12) United States Patent
Mirshekar-Syahkal et al.

(10) Patent No.: US 6,552,837 B2
(45) Date of Patent: Apr. 22, 2003

(54) OPTICAL MODULATOR WITH INTEGRATED DRIVER

(75) Inventors: Dariush Mirshekar-Syahkal, Colchester (GB); Eric Goutain, San Diego, CA (US)

(73) Assignee: ModeTek, Inc, Carlsbad, CA (US)

( * ) Notice: Subject to any disclaimer, the term of this patent is extended or adjusted under 35 U.S.C. 154(b) by 0 days.

(21) Appl. No.: 09/858,794

(22) Filed: May 15, 2001

(65) Prior Publication Data

US 2002/0109897 A1 Aug. 15, 2002

Related U.S. Application Data (60) Provisional application No. 60/269,211, filed on Feb. 15, 2001.

(51) Int. Cl.[7] .............................. G02F 1/07; G02F 1/33
(52) U.S. Cl. ........................ 359/245; 359/264; 359/311
(58) Field of Search ................................ 359/245, 264, 359/311, 305, 285, 323, 287, 180, 188, 181

(56) References Cited

U.S. PATENT DOCUMENTS

| | | | |
|---|---|---|---|
| 5,074,631 A | 12/1991 | Hamano et al. | 385/3 |
| 5,303,079 A | 4/1994 | Gnauck et al. | 359/188 |
| 5,548,246 A * | 8/1996 | Yamamoto et al. | 330/51 |
| 5,621,560 A | 4/1997 | Wood | 359/161 |
| 5,706,116 A * | 1/1998 | Sugata | 359/180 |
| 5,793,782 A | 8/1998 | Meyrueix | 372/26 |
| 5,991,471 A | 11/1999 | Yu | 385/3 |
| 6,078,414 A | 6/2000 | Iwano | 359/124 |
| 2001/0053165 A1 * | 12/2001 | Wang et al. | 372/38.02 |

* cited by examiner

Primary Examiner—Georgia Epps
Assistant Examiner—Timothy Thompson
(74) Attorney, Agent, or Firm—Gray Cary Ware & Freidenrich; Terrance A. Meador (57) ABSTRACT

An integrated high speed driver/modulator assembly includes a driver amplifier assembly having a specified input impedance, such as 50 ohms. The driver/modulator assembly also includes an optical modulator having a modulator transmission line. The impedance of the modulator transmission line is less than the specified input impedance, which results in a reduced $V\pi$ for the optical modulator. The reduction in $V\pi$ enables the driver/modulator assembly to more effectively support OC-768 and higher data rates of at least 40 Gb/s.

43 Claims, 4 Drawing Sheets

OPTICAL MODULATOR WITH INTEGRATED DRIVER

CROSS REFERENCE TO RELATED APPLICATION

This application claims priority of United States provisional application serial no. 60/269,211, titled Integrated Modulator Driver with Optimized Impedance, filed Feb. 15, 2001, the contents of which are incorporated by reference herein.

FIELD OF THE INVENTION

The present invention relates generally to high speed optical modulators. More particularly, the present invention relates to a high speed optical modulator having an integrated driver amplifier.

BACKGROUND OF THE INVENTION

Many high frequency electronic components, devices, and subsystems, e.g., those utilized in radio frequency (RF) and microwave applications, are designed such that they exhibit a standard input/output port impedance of 50 ohms. Although the standard 50 ohm impedance provides connection uniformity and reduces the amount of customized system design, it can restrict the design and/or performance of certain components and subsystems. High speed optical modulators are no exception and their 50 ohm RF input port impedance is normally compatible with driver amplifiers having a 50 ohm RF output port impedance.

The prior art is replete with various RF and microwave driver amplifier components and optical modulator components. Briefly, such driver amplifiers receive an electrical data signal having a high data rate, e.g., 10 Gb/s. The data signal propagates over a transmission line having a standard line impedance of 50 ohms. Thus, most prior art driver amplifier components utilize 50 ohm input and output connectors that match the 50 ohm transmission line impedance. In addition, such driver components utilize amplifier chips or devices having 50 ohm input and output impedances.

Many high speed systems employ optical modulators, such as the Mach-Zehnder optical modulator. Mach-Zehnder optical modulators are well known to those skilled in the art and, therefore, are not described in detail herein. Briefly, an optical modulator can be configured to receive an amplified data signal from a driver amplifier component, along with an unmodulated continuous wave (CW) optical input. The optical modulator is configured to modulate the optical signal in response to the electrical data signal. The optical input is carried by an optical waveguide formed within a substrate, and the electrical data signal propagates over a transmission line located above the optical waveguide. Most prior art optical modulators utilize a 50 ohm transmission line that is compatible with the 50 ohm output impedance of most standard RF driver amplifier components.

Prior art driver-modulator combinations have required the driver output impedance and modulator input impedance to be 50 ohms for compatibility with the standard for external connectors and for standard chip interfaces. Mach-Zehnder optical modulators having a 50 ohm RF input impedance require a relatively high electrical driving voltage (this driving voltage is typically known as the $V\pi$ of the modulator). Unfortunately, most practical driver amplifiers cannot achieve the required drive voltage, particularly at very high data rates of up to 40 Gb/s. For example, conventional Mach-Zehnder modulators having 50 ohm impedances operate with a $V\pi$ of approximately six to eight volts. However, currently available driver amplifiers can only achieve approximately five volts at 40 Gb/s. In addition, higher $V\pi$ values result in higher driver gain requirements and correspondingly higher driver operating temperatures. Due to the high temperature sensitivity of practical Mach-Zehnder modulators, excessive heat generated by the driver can adversely affect modulator performance, especially if the modulator is not thermally insulated from the driver. Accordingly, lower $V\pi$ values may lead to better modulator performance.

One way to decrease the $V\pi$ of the modulator is to reduce the characteristic impedance of the modulator transmission line. However, reducing this impedance affects the impedance of the RF modulator port unless a matching circuit is implemented between the driver output port and the modulator transmission line. Unfortunately, matching circuits are not desirable in most practical high speed applications because they adversely affect the frequency response of the modulator and increase the insertion loss and length of the modulator.

BRIEF SUMMARY OF THE INVENTION

An integrated driver/modulator assembly according to the present invention effectively reduces the $V\pi$ requirement of the optical modulator such that the assembly can utilize practical driver amplifier designs in high speed (e.g., 40 Gb/s) applications. In accordance with the preferred embodiment, the driver/modulator assembly utilizes an electrical transmission line having a characteristic impedance that is less than the standard 50 ohm impedance found in most commercially available RF and microwave components. In addition, the driver/modulator assembly preferably employs a driver amplifier design having a final output impedance that matches the reduced impedance of the modulator transmission line. In this regard, the driver/modulator assembly need not utilize an impedance matching circuit between the output of the driver amplifier and the input of the optical modulator. Furthermore, the driver/modulator assembly need not utilize external RF connectors between the driver amplifier and the optical modulator; the preferred practical embodiment houses the driver amplifier and the optical modulator together in a single component package.

The above and other aspects of the present invention may be carried out in one form by an integrated driver/modulator that includes a driver amplifier assembly having a driver input impedance and a driver output impedance different than the driver input impedance, and an optical modulator coupled to the driver amplifier assembly. The optical modulator includes an electrical transmission line having a modulator transmission line impedance that matches the driver output impedance.

BRIEF DESCRIPTION OF THE DRAWINGS

A more complete understanding of the present invention may be derived by referring to the detailed description and claims when considered in conjunction with the following Figures, wherein like reference numbers refer to similar elements throughout the Figures.

DETAILED DESCRIPTION OF A PREFERRED EMBODIMENT

The present invention may be described herein in connection with functional block components and various circuit schematics. It should be appreciated that functional blocks and circuits may be realized by any number of hardware components configured to perform the specified functions. For example, the present invention may employ various integrated circuit components, e.g., amplifiers, RF transmission lines, optical waveguides, and the like. In addition, those skilled in the art will appreciate that the present invention may be practiced in any number of system environments and that the particular architectures described herein reflect exemplary applications for the invention.

It should be appreciated that the particular implementations shown and described herein are illustrative of the invention and its best mode and are not intended to otherwise limit the scope of the invention in any way. Indeed, for the sake of brevity, conventional techniques for RF amplification, electrical signal transmission, optical signal transmission, optical modulation, and other functional aspects of certain operating components may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical embodiment.

Figure 1:
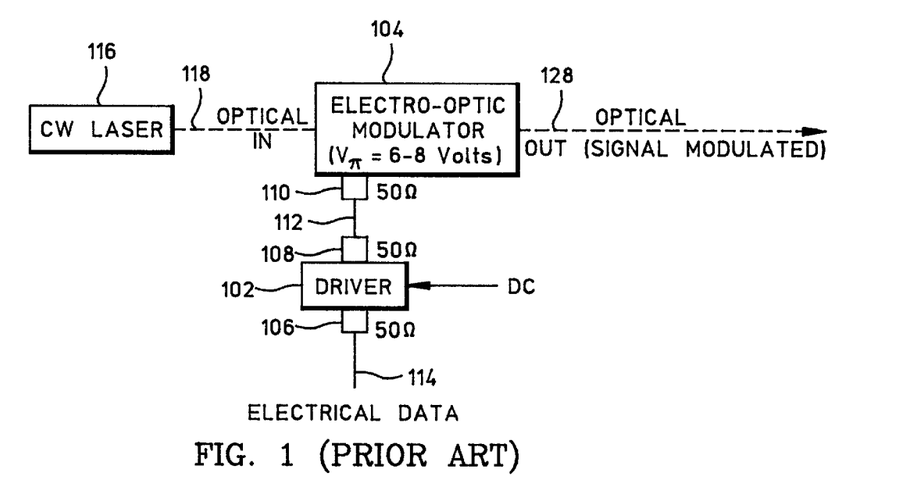
FIG. 1 is a schematic representation of a prior art driver amplifier connected to a prior art optical modulator.

FIG. 1 is a schematic block diagram of a typical prior art arrangement of an RF driver amplifier 102 connected to an optical modulator 104. In accordance with prior art techniques, driver amplifier 102 and optical modulator 104 are realized as physically distinct components, each having its own physical package configuration. In this regard, driver amplifier 102 includes an input connector 106 and an output connector 108, each configured according to standard RF connector specifications. Similarly, optical modulator 104 includes an input connector 110, which is also configured according to standard RF connector specifications. In most practical applications, input connector 106, output connector 108, and input connector 110 are each characterized by a 50 ohm impedance to match the standard 50 ohm impedance of the driver components, the driver transmission line, and the modulator transmission line.

A connector or cable 112 may be utilized as an RF coupler between driver amplifier 102 and optical modulator 104. Connector 112 also exhibits a 50 ohm impedance and it mates with output connector 108 and input connector 110. Similarly, the unamplified data signal may be provided to driver amplifier 102 via a 50 ohm cable or connector 114 that mates with input connector 106.

In the context of a practical OC-192 system, driver amplifier 102 receives a relatively low level (approximately 0.25 volts) 10 Gb/s data signal at input connector 106. Driver amplifier 102 amplifies the input signal according to known techniques and generates a relatively high level (approximately six to eight volts) 10 Gb/s data signal at output connector 108. In a practical application, the digital data is transmitted with the output signal on a DC level equal to the drive voltage (V$\pi$) of optical modulator 104. In practical implementations, optical modulator 104 requires a V$\pi$ of approximately six to eight volts. At a data rate of 10 Gb/s, driver amplifier 102 can utilize well known techniques to generate an output data signal at a suitable drive voltage level (between six to eight volts) into a 50 ohm impedance.

Optical modulator 104 receives the relatively high level data signal as an electrical input, along with an optical signal generated by a CW laser source 116. The CW input signal is carried by an optical fiber 118, which feeds an optical waveguide element (not shown) of optical modulator 104. In accordance with known techniques, optical modulator modulates the CW optical input signal in response to the electrical data signal and generates a modulated optical signal as an output. The modulated optical signal is characterized by a 10 Gb/s data rate. This output is carried by an optical fiber 120 (the output may be utilized in an appropriate manner by the particular system).

Figure 2:
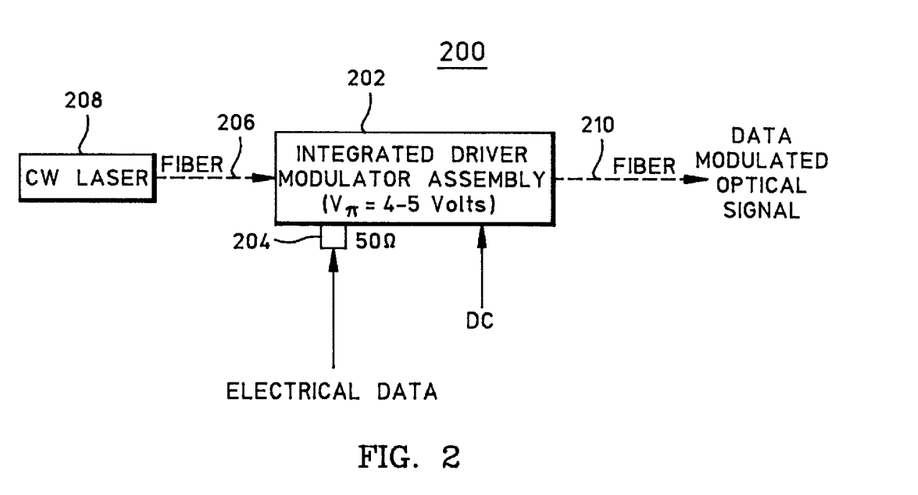
FIG. 2 is a schematic representation of a typical operating environment for a driver/modulator assembly.

FIG. 2 is a schematic block diagram showing a typical operating environment for an integrated driver/modulator assembly 200 according to a preferred embodiment of the present invention. In contrast to the prior art arrangement shown in FIG. 1, driver/modulator assembly 200 preferably includes a single component package 202 that contains both a driver amplifier assembly and an optical modulator, each of which is configured as described in more detail below. In this regard, driver/modulator assembly 200 need not employ additional RF connectors or cables between discrete driver and modulator components, thus reducing the likelihood of mismatching, signal power loss, and complex tuning. A practical implementation of driver/modulator assembly 200 may include an input connector 204 configured to receive an electrical conductor that carries an input data signal, an input optical fiber section 206 that carries an optical signal from a CW laser source 208, and an output optical fiber section 210 that carries the modulated optical signal generated by driver/modulator assembly 200. In accordance with conventional packaging techniques, the optical fiber runs through the physical package that houses driver/modulator assembly 200. The input optical fiber section 206 can be spliced with the optical fiber from laser source 208, or a suitable connector (not shown) may be used. The output optical fiber section 210 may be terminated with a suitable connector (not shown).

In the context of most practical implementations, the input data signal is a relatively low level (approximately 0.25 volts) electrical signal. In addition, input connector 204 preferably has a 50 ohm impedance for compatibility with most currently available RF and microwave system components. Laser source 208 may be configured in a conventional manner for compliance with ITU standards, e.g., ITU Recommendation G.692. A variety of suitable laser sources, RF connectors, and optical fiber connectors are commercially available from a number of component manufacturers.

In accordance with the preferred practical embodiment, driver/modulator assembly 200 is suitably configured to accommodate OC-768 data rates (i.e., 39.81312 Gb/s) and higher data rates. In this regard, the driver amplifier assembly and the optical modulator utilized by driver/modulator assembly 200 are configured for compatibility with SONET systems and, more particularly, for compatibility with OC-768 systems. In contrast, due to the practical limitations of discrete RF driver amplifier designs, prior art assemblies (such as the assembly shown in FIG. 1) cannot adequately modulate OC-768 data signals.

Figure 3:
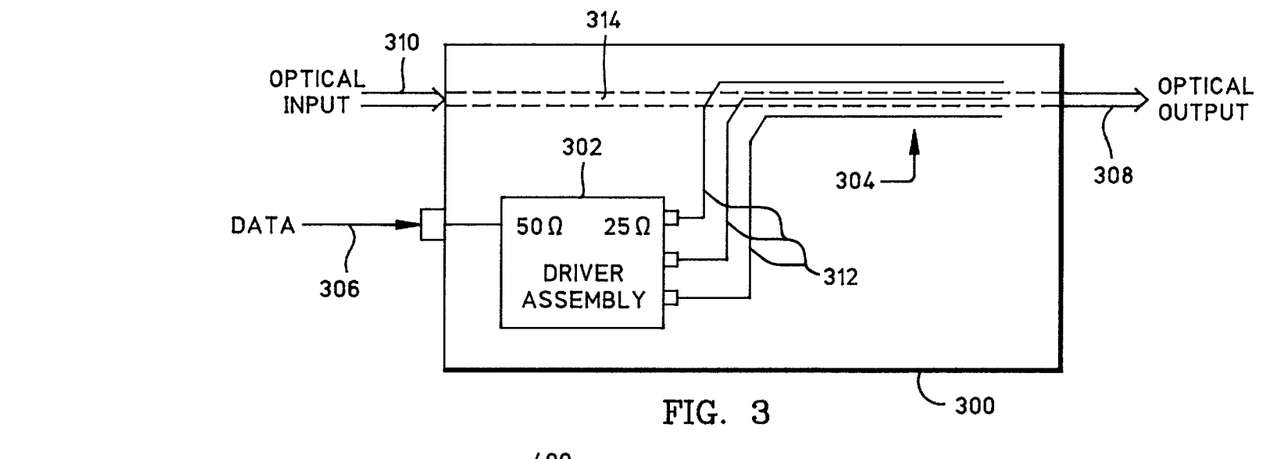
FIG. 3 is a schematic representation of a driver/modulator assembly.

FIG. 3 is a schematic representation of a driver/modulator assembly 300 according to a preferred embodiment of the present invention. Driver/modulator assembly 300 represents one practical implementation of driver/modulator assembly 200 described above. Accordingly, the above description of driver/modulator assembly 200 also applies in the context of driver/modulator assembly 300. Driver/modulator assembly 300 generally includes a driver amplifier assembly 302 and an optical modulator 304 coupled to driver amplifier assembly 302. Briefly, the driver/modulator assembly 300 receives an electrical data signal 306 as an input and generates a modulated optical signal 308 as an output. Driver amplifier assembly 302 is configured to generate a drive signal in response to electrical data signal 306, and optical modulator 304 is configured to modulate a CW optical input signal 310 in response to the drive signal to thereby generate modulated optical signal 308.

Optical modulators can be manufactured using different device technologies. For example, optical modulators may utilize semiconductor, lithium niobate, or polymer technologies. For various reasons, optical modulators having lithium niobate substrates are often used in practical high speed applications. Although most practical embodiments of the present invention employ lithium niobate, the present invention is not limited to any particular device technology. Indeed, a semiconductor-based optical modulator substrate may be desirable in some integrated driver/modulator designs, particularly those in which the driver devices are fabricated into the semiconductor substrate alongside the modulator transmission lines.

The drive signal generated by driver amplifier assembly 302 propagates over a modulator transmission line 312, which may be formed on a suitable substrate. Modulator transmission line 312 can be a coplanar waveguide, a microstrip line, or any other suitable transmission line, transmission structure, or distributed circuit. Optical modulator 304 includes an optical waveguide element 314 (depicted in dashed lines) that cooperates with modulator transmission line 312 such that the drive signal carried on modulator transmission line 312 can modulate optical input signal 310 in an appropriate manner. Optical modulator 304 can employ conventional techniques to "convert" electrical data signal 306 to the optical domain. Although any number of conventional optical modulator designs (including those that do not utilize a modulator transmission line, e.g., an electroabsorption modulator) may be suitable for use with the present invention, the preferred practical embodiments utilize Mach-Zehnder modulators. FIG. 3 (and other figures) simplistically depicts modulator transmission line 312 as three lines, each of which represents a conductive trace formed on the modulator substrate. In the context of a Mach-Zehnder modulator design, one conductive trace carries the drive signal and the other two conductive traces are RF grounds. In addition, FIG. 3 (and other figures) simplistically depicts optical waveguide 314 as a single straight waveguide. Those skilled in the art will appreciate that the actual configuration and layout of the optical waveguide and the modulator transmission line will depend on the particular implementation.

Driver amplifier assembly 302 has a driver input impedance and a driver output impedance that is different than the driver input impedance. In practical embodiments, the driver output impedance is less than the driver input impedance. For example (as shown in FIG. 3), for compatibility with system specifications, the driver input impedance may be 50 ohms, while the driver output impedance may be 25 ohms. Consequently, the input section of driver amplifier assembly 302 would exhibit a 50 ohm impedance and the output section of driver amplifier assembly 302 would exhibit a 25 ohm impedance. In addition, modulator transmission line 312 would be designed such that its impedance substantially matches the driver output impedance of 25 ohms. Of course, the impedance values of 50 ohms and 25 ohms are merely illustrative of one specific example embodiment and the present invention is not limited to any impedance or range of impedance.

The reduced driver output impedance and corresponding modulator transmission line impedance enables optical modulator 304 to operate at a reduced $V\pi$, relative to conventional designs that accommodate a 50 ohm driver output impedance. For example, a practical driver/modulator assembly configured in accordance with the present invention can operate with a $V\pi$ of less than five volts. The reduced $V\pi$ requirement also facilitates the use of known driver amplifier designs that support OC-768 data rates. For example, a practical driver amplifier design should be configured to operate with a bandwidth of at least 50 GHz, which is sufficient to accommodate OC-768 data rates using return-to-zero (RZ) data, non-return-to-zero (NRZ) data, or other types such as carrier suppressed return to zero (CS-RZ) data, single side band return to zero (SSB-RZ) data, and the like.

In a practical embodiment, driver amplifier assembly 302 generates the drive signal such that the data is carried on a DC voltage level that approximates the $V\pi$ value. Accordingly, optical modulator 304 need not utilize a separate DC voltage source for $V\pi$. Rather, the drive signal itself includes the $V\pi$ component along with the data component.

As used herein, a driver amplifier assembly may include one or more discrete driver amplifier devices. Due to physical device limitations, the preferred embodiment employs a multistage driver amplifier assembly. For example, a driver amplifier assembly may include a plurality of driver amplifier devices connected in series such that an initial driver amplifier device has an input impedance that corresponds to the driver input impedance of the driver amplifier assembly (e.g., 50 ohms), and such that a final driver amplifier device has an output impedance that corresponds to the driver output impedance of the driver amplifier assembly (e.g., 25 ohms). Alternatively, a driver amplifier assembly may include a plurality of driver amplifier devices connected in parallel such that each of the individual driver amplifier devices share a common input signal and such that each of the individual driver amplifier devices contributes an output onto the modulator transmission line.

Figure 4:
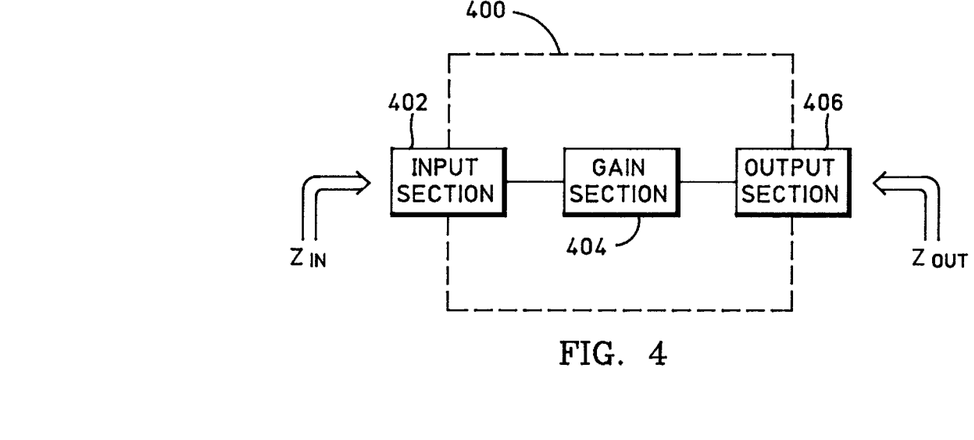
FIG. 4 is a schematic representation of a driver amplifier assembly.

FIG. 4 is a schematic block diagram that illustrates the input and output impedances of a driver amplifier assembly 400. FIG. 4 can represent a driver amplifier assembly having a plurality of driver amplifier devices, or a single driver amplifier device. Briefly, driver amplifier assembly 400 may include an input section 402, a gain section 404, and an output section 406. Input section 402 is suitably configured to receive an input signal (e.g., the low level system data signal or an intermediate data signal generated by a previous driver amplifier stage), to maintain a specific input impedance, and to transition the electrical signal to gain section 404. Input section 402 may include a suitable impedance matching circuit designed for the particular application. As described herein, a number of input, output, and intermediate impedances are preferably matched to optimize RF signal transmissions. Although, in theory, "matching" impedances are preferred, practical implementations may employ designs that tolerate some inequalities. For example, an output impedance of one section may only approximate or substantially match an input impedance of another section. In addition, a small amount of impedance mismatching, along with the resulting return loss and reflection, may be tolerated in a practical design. In this regard, a "substantially matching" impedance may be defined as a transition from one impedance to another, where the two impedances differ by less than about ten percent. In most practical embodiments, an impedance mismatch in excess of ten percent results in a return loss of more than −10 dB (which is usually unacceptable).

Gain section 404 amplifies the received signal using any number of known RF amplification methodologies. The amplified signal may be fed to output section 406, which is configured to maintain a specific output impedance and to make the amplified signal available for use by the modulator transmission line or by the following driver amplifier stage. Output section 406 may include a suitable impedance matching circuit designed for the particular application.

The specific design of a practical driver amplifier assembly may include the design of suitable input and output impedance matching circuits and the design of suitable transmission lines that carry the RF input and output signals. Those skilled in the art can design individual amplifier devices, impedance matching circuits, and/or driver amplifier assemblies to suit the particular application. For example, any number of RF circuit design tools, CAD software applications, electronic design simulation programs, and other reference materials may be utilized to design a driver amplifier assembly or an individual driver amplifier device suitable for use in connection with the present invention. Thus, given a known system input impedance for the data signal (e.g., 50 ohms), a known driver amplifier bandwidth, a known driver amplifier gain, a known driver amplifier output impedance that substantially matches the modulator transmission line impedance (e.g., 25 ohms), and other design parameters, the above-mentioned tools may be employed to design input section 402, gain section 404, output section 406, an input transmission line, and/or an output transmission line.

Figure 5:
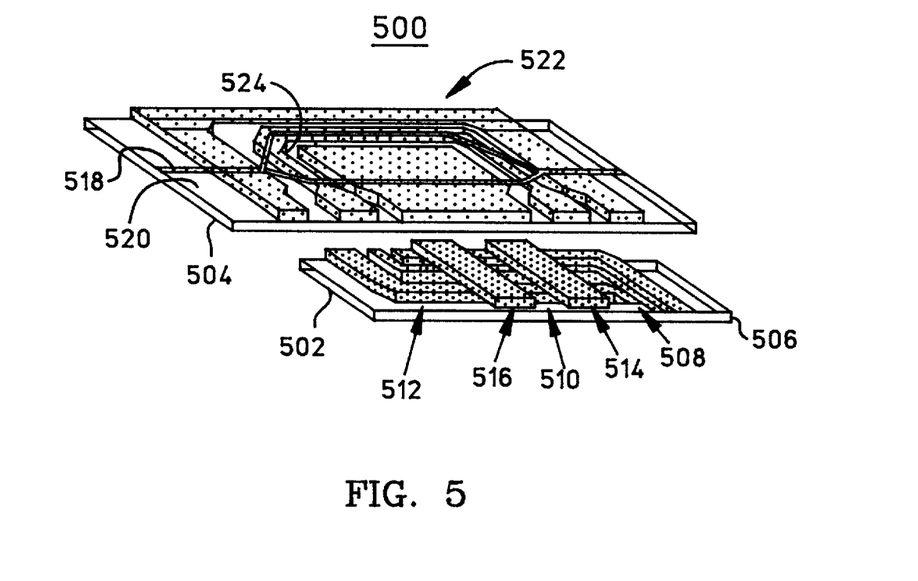
FIG. 5 is a perspective view showing several components of an example driver/modulator assembly.
Figure 6:
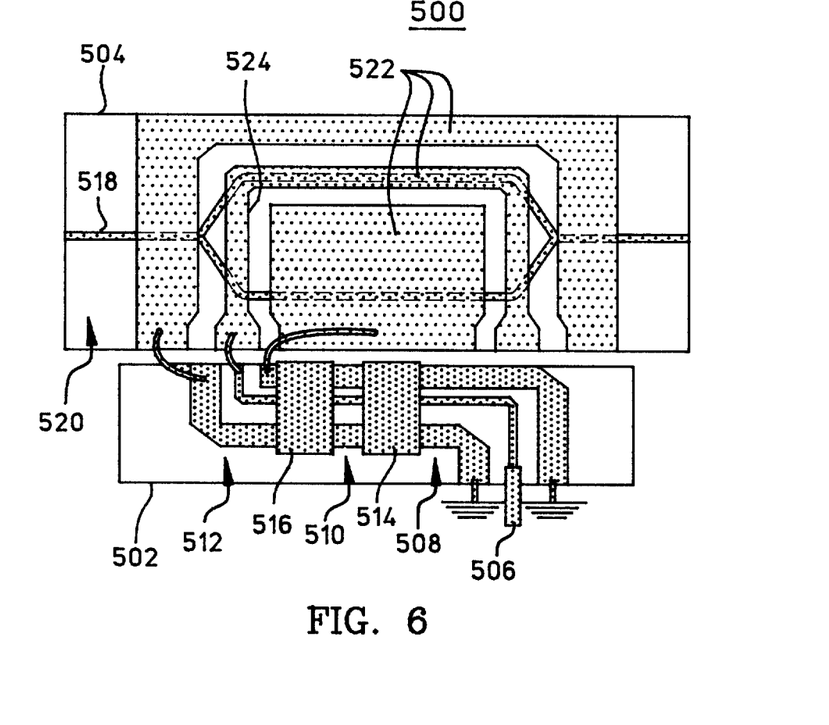
FIG. 6 is a top view of the driver/modulator assembly shown in FIG. 5.

FIG. 5 is a perspective view showing several components of an example driver/modulator assembly 500, and FIG. 6 is a top view of driver/modulator assembly 500. For clarity, packaging components are not shown in FIGS. 5 and 6. Driver/modulator assembly 500 represents one preferred practical embodiment of the present invention that employs a plurality of driver amplifier devices coupled in series. Driver/modulator assembly 500 includes a driver amplifier assembly 502 coupled to an optical modulator 504.

Driver amplifier assembly 502 includes an input connector 506 configured to receive an electrical conductor that carries the input data signal. In a practical embodiment, input connector 506 is a suitably designed RF connector having an impedance of 50 ohms for compatibility with system requirements. Driver amplifier assembly 502 includes a driver input transmission line 508, an intermediate transmission line 510, and a driver output transmission line 512. Driver amplifier assembly 502 can utilize conventional RF transmission line design techniques for these transmission lines. For example, the various transmission line sections may be realized by conductive traces formed on a suitable substrate material. For purposes of this example embodiment, driver amplifier assembly 502 includes one conductive trace that carries the data signal and two conductive traces that serve as RF grounds.

An initial driver amplifier device 514 has an input section coupled to driver input transmission line 508 and an output section coupled to intermediate transmission line 510. A final driver amplifier device 516 has an input section coupled to intermediate transmission line 510 and an output section coupled to driver output transmission line 512. For the sake of clarity, FIGS. 5 and 6 do not depict the input and output sections of the driver amplifier devices. The input impedance of initial driver amplifier device 514 (i.e., the impedance of the input section of initial driver amplifier device 514) substantially matches the impedance of driver input transmission line 508, and the output impedance of final driver amplifier device 516 (i.e., the impedance of the output section of final driver amplifier device 516) substantially matches the impedance of driver output transmission line 512. In addition, the output impedance of initial driver amplifier device 514 (i.e., the impedance of the output section of initial driver amplifier device 514) and the input impedance of final driver amplifier device 516 (i.e., the impedance of the input section of final driver amplifier device 516) approximate or match the impedance of intermediate transmission line 510.

In accordance with one practical example, the impedance of driver input transmission line 508 is 50 ohms (for compatibility with standard RF and microwave components). Consequently, the input impedance of initial driver amplifier device 514 is also 50 ohms. For this example, the output impedance of initial driver amplifier device 514, the impedance of intermediate transmission line 510, and the input impedance of final driver amplifier device 516 is 25 ohms. Finally, the output impedance of final driver amplifier device 516 and the impedance of driver output transmission line 512 is also 25 ohms. Notably, driver amplifier assembly 500 may be designed to exhibit alternative input and output impedances and these example impedance values are not intended to limit the scope of the present invention in any way. For example, the output impedance of initial driver amplifier device 514, the impedance of intermediate transmission line 510, and the input impedance of final driver amplifier device 516 can be 50 ohms rather than 25 ohms. Thus, in one example embodiment, the input impedance of initial driver amplifier device 514 is equal to the impedance of intermediate transmission line 510; in another example embodiment, the input impedance is less than the intermediate impedance.

The general arrangement of driver/modulator assembly 500 can be suitably modified to accommodate a single driver amplifier device coupled between a driver input transmission line and a driver output transmission line, or to accommodate three or more discrete driver amplifier devices connected in series between a driver input transmission line and a driver output transmission line. Driver amplifier assembly 500 can include any number of additional intermediate transmission lines to accommodate additional driver amplifier devices.

With continued reference to FIGS. 5 and 6, optical modulator 504 generally includes an optical waveguide 518 formed within a substrate 520, and a modulator transmission line 522. As depicted in FIG. 6, driver output transmission line 512 is suitably coupled to modulator transmission line 522. The Mach-Zehnder modulator depicted in FIGS. 5 and 6 includes one transmission line element (or electrode) 524 that carries the electrical drive signal; the remaining two transmission line elements correspond to RF ground. In practice, driver output transmission line 512 and modulator transmission line 522 may be connected together using wire bonds, conductive tabs, metallic ribbons, or the like. As shown in FIG. 6, the signal trace on driver amplifier assembly 502 is coupled to the transmission line element 524, and the respective ground traces on driver amplifier assembly 502 are coupled to corresponding ground traces on optical modulator 504.

The modulator input impedance, and modulator transmission line 522 in particular, is preferably configured such that its impedance substantially matches the output impedance of driver amplifier assembly 502. As mentioned above, practical embodiments may exhibit some impedance mismatching between driver amplifier assembly 502 and modulator transmission line 522 and the present invention need not be limited to designs having precise impedance matches. For example, a practical driver/modulator assembly can tolerate impedance mismatches of up to ten percent, which results in manageable return loss characteristics. Accordingly, the techniques of the present invention need not be restricted to driver/modulator assemblies having a modulator input impedance that precisely matches the output impedance of the corresponding driver amplifier assembly. In the illustrated example, the impedance of modulator transmission line 522 matches the impedance of driver output transmission line and the output impedance of final driver amplifier device 516. As described above, this impedance is preferably less than the input impedance of driver amplifier assembly 502. For the example embodiment described above, modulator transmission line 522 exhibits an impedance of 25 ohms. As mentioned above, the specific layout of modulator transmission line 522 can be designed with the assistance of any number of CAD programs, simulation software, and other design tools known to those skilled in the art.

Optical modulator 504 modulates the input optical signal with the electrical drive signal carried on modulator transmission line 522. The resultant modulated optical signal is routed from optical waveguide 518 to an output fiber connector (not shown). In a practical implementation, modulator transmission line 522 is terminated with a suitably configured component or load (not shown), e.g., a termination having a 25 ohm resistance.

Figure 7:
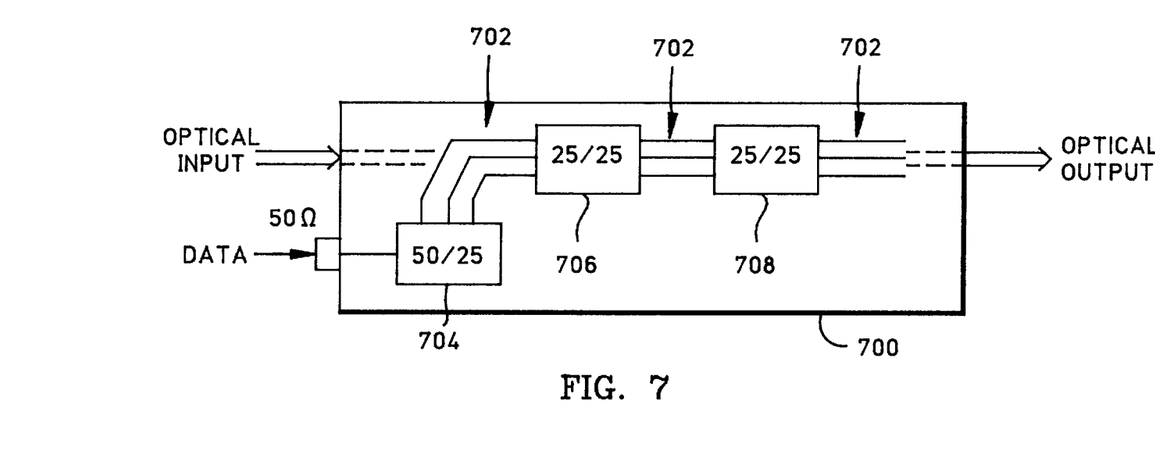
FIG. 7 is a schematic representation of one alternate driver/modulator configuration.

FIG. 7 is a schematic representation of an alternate driver/modulator assembly 700 according to the present invention. The above description of the general features and operation of optical modulators, transmission line configurations, and other aspects of driver/modulator assemblies 200, 300, and 500 also applies to driver/modulator assembly 700. Driver/modulator assembly 700 includes one or more driver amplifier devices (the example shown in FIG. 7 includes three discrete devices connected in series) coupled to a modulator transmission line 702. In contrast to driver/modulator assembly 500, the driver amplifier devices of driver/modulator assembly 700 can be directly mounted on the modulator transmission line 702. In practice, it may be necessary to partition modulator transmission line 702 into a number of discrete sections to accommodate this alternate design.

A first driver amplifier device 704 exhibits an input impedance that differs from the impedance of modulator transmission line 702. Preferably, the impedance of modulator transmission line 702 is less than the input impedance to the driver amplifier assembly. For example, the input impedance of driver amplifier device 704 may be 50 ohms, as shown in FIG. 7, and the impedance of modulator transmission line 702 may be 25 ohms. Consequently, driver amplifier device 704 is suitably configured such that its output impedance substantially matches the modulator transmission line impedance of 25 ohms. In this example, the input impedance and output impedance of a second driver amplifier device 706 match the transmission line impedance of 25 ohms. Similarly, the input impedance and output impedance of a third driver amplifier device 708 also match the 25 ohm line impedance.

It should be appreciated that the specific impedance values set forth above are not intended to limit the present invention in any way. Indeed, driver amplifier device 704 can be suitably designed to accommodate any specified input impedance (50 ohms has been selected as a convenient example). In addition, the modulator transmission line impedance need not have a consistent value. For example, the modulator transmission line may be divided into segments having different line impedances to accommodate driver amplifier devices with various input and output impedances.

Figure 8:
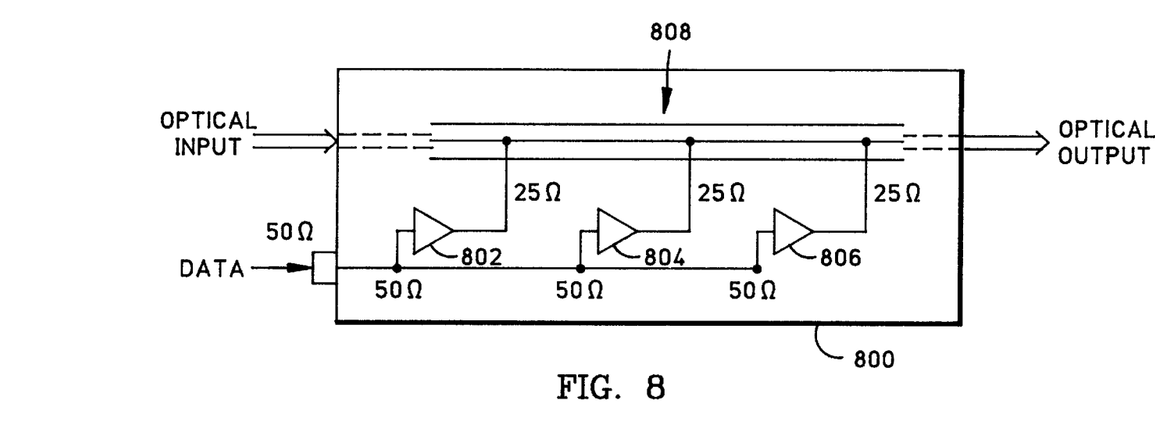
FIG. 8 is a schematic representation of a driver/modulator having a distributed configuration.

FIG. 8 is a schematic representation of another alternate driver/modulator assembly 800 according to the present invention. The above description of the general features and aspects of optical modulators, transmission line configurations, and other aspects of driver/modulator assemblies 200, 300, and 500 also applies to driver/modulator assembly 800. Briefly, driver/modulator assembly 800 includes a plurality of driver amplifier devices (three are shown in FIG. 8), each having the same input impedance. The driver amplifier devices are connected in parallel and each of the driver amplifier devices has the same output impedance.

Driver/modulator assembly 800 provides the input data signal in common to each of the driver amplifier devices. An initial driver amplifier device 802 receives the common input data signal and generates an amplified data signal. The output of initial driver amplifier device 802 is coupled to a modulator transmission line 808 (in particular, the output is coupled to the conducive trace or electrode associated with the drive signal). As described above in connection with other embodiments, the impedance of modulator transmission line 808 is less than the input impedance of the driver amplifier assembly. In the example shown in FIG. 8, the input impedance of each of the driver amplifier devices is 50 ohms and the impedance of modulator transmission line 808 is 25 ohms. Consequently, the output impedance of each driver amplifier device is 25 ohms.

It should be appreciated that the specific impedance values set forth above are not intended to limit the present invention in any way. Indeed, the driver amplifier devices and modulator transmission line 808 can be suitably designed to accommodate any specified input impedance (50 ohms has been selected as a reasonable example value) and any specified output impedance (25 ohms has been selected as a reasonable example value).

Second driver amplifier device 804 and final driver amplifier device 806 are both connected in parallel with initial driver amplifier device 802. Accordingly, the output of second driver amplifier device 804 and the output of final driver amplifier device 806 are also coupled to modulator transmission line 808. In this arrangement, a plurality of discrete driver amplifier devices are distributed along the length of the modulator transmission line.

The driver amplifier devices of driver/modulator assembly 800 can be physically mounted on the modulator transmission line 808 or on a separate substrate. If mounted on a separate substrate, then the output sections of the driver amplifier devices may be coupled to modulator transmission line 808 using wire bonds, conductive tabs, metallic ribbons, or the like. In addition, driver/modulator assembly 800 may utilize a suitably configured input transmission line to carry the input data signal from the input connector to each of the driver amplifier devices.

The driver/modulator assemblies described above in connection with FIGS. 5–8 can support OC-768 data rates. In practice, each of these driver/modulator assemblies can be configured to receive a relatively low level (0.25 volts) data signal having a data rate up to the OC-768 rate. To accommodate conventional system specifications, the impedance of the data signal input port is preferably 50 ohms. However, each of these driver/modulator assemblies utilizes a modulator transmission line having an impedance (e.g., 25 ohms) that is less than the impedance of the input port. This reduction in the modulator transmission line impedance allows the optical modulator to effectively operate with a reduced $V\pi$. In turn, the reduced $V\pi$ requirement makes it easier to design driver amplifier assemblies that support the high speed OC-768 data rate. The techniques of the present invention may also be utilized in high speed applications that exceed the OC-768 data rate.

The present invention has been described above with reference to various preferred embodiments. However, those skilled in the art having read this disclosure will recognize that changes and modifications may be made to the preferred embodiment without departing from the scope of the present invention. These and other changes or modifications are intended to be included within the scope of the present invention, as expressed in the following claims.

What is claimed is:

1. An integrated driver/modulator comprising:
   a driver amplifier assembly having a driver input impedance and a driver output impedance different than said driver input impedance; and
   an optical modulator coupled to said driver amplifier assembly, said optical modulator having a modulator input impedance that substantially matches said driver output impedances wherein
      said driver input impedance is 50 ohms; and
      said driver output impedance is less than 50 ohms.

2. An integrated driver/modulator according to claim 1, wherein said driver output impedance is 25 ohms.

3. An integrated driver/modulator comprising:
   a driver amplifier assembly having a driver input impedance and a driver output impedance different than said driver input impedance; and
   an optical modulator coupled to said driver amplifier assembly, said optical modulator having a modulator input impedance that substantially matches said driver output impedance; wherein
      said driver amplifier assembly comprises a plurality of driver amplifier devices including at least an initial driver amplifier device and a final driver amplifier device;
      said initial driver amplifier device has an input impedance that substantially matches said driver input impedance; and
      said final driver amplifier device has an output impedance that substantially matches said driver output impedance.

4. An integrated driver/modulator according to claim 3, wherein:
   said driver input impedance is 50 ohms; and
   said driver output impedance is less than 50 ohms.

5. An integrated driver/modulator comprising:
   a driver amplifier assembly having a driver input impedance and a driver output impedance different than said driver input impedance; and
   an optical modulator coupled to said driver amplifier assembly, said optical modulator having a modulator input impedance that substantially matches said driver output impedance; wherein
      said driver amplifier assembly is configured to operate with a bandwidth of at least 30 GHz.

6. An integrated driver/modulator comprising:
   a driver amplifier assembly having a driver input impedance and a driver output impedance different than said driver input impedance; and
   an optical modulator coupled to said driver amplifier assembly, said optical modulator having a modulator input impedance that substantially matches said driver output impedance; wherein
      said driver amplifier assembly is configured to accommodate drive signals having a data rate of at least 40 Gb/s.

7. An integrated driver/modulator comprising:
   a driver amplifier assembly having a driver input impedance and a driver output impedance different than said driver input impedance; and
   an optical modulator coupled to said driver amplifier assembly, said optical modulator having a modulator input impedance that substantially matches said driver output impedance; wherein
      said driver amplifier assembly and said optical modulator are configured for compatibility with OC-192 systems.

8. An integrated driver/modulator according to claim 7, wherein said driver amplifier assembly and said optical modulator are configured for compatibility with OC-768 systems.

9. An integrated driver/modulator comprising:
   a driver amplifier assembly having a driver input impedance and a driver output impedance different than said driver input impedance; and
   an optical modulator coupled to said driver amplifier assembly, said optical modulator having a modulator input impedance that substantially matches said driver output impedance; wherein
      said optical modulator operates with a drive voltage of less than 5 volts.

10. An integrated driver/modulator comprising:
    a driver amplifier assembly having a driver input impedance and a driver output impedance different than said driver input impedance; and
    an optical modulator coupled to said driver amplifier assembly, said optical modulator having a modulator input impedance that substantially matches said driver output impedance; wherein
       said driver amplifier assembly comprises a driver input transmission line having an impedance that substantially matches said driver input impedance, a driver output transmission line having an impedance that substantially matches said driver output impedance, and a driver amplifier device coupled to said driver input transmission line and to said driver output transmission line; and
       said optical modulator is coupled to said driver output transmission line.

11. An integrated driver/modulator comprising:
    a driver amplifier assembly having a driver input impedance and a driver output impedance different than said driver input impedance; and
    an optical modulator coupled to said driver amplifier assembly, said optical modulator having a modulator input impedance that substantially matches said driver output impedance; wherein said driver amplifier assembly comprises a driver input transmission line having an impedance that substantially matches said driver input impedance, a driver output transmission line having an impedance that substantially matches said driver output impedance, and a plurality of driver amplifier devices coupled in series between said driver input transmission line and said driver output transmission line; and said optical modulator is coupled to said driver output transmission line.

12. An integrated driver/modulator comprising:

a driver amplifier assembly comprising:

a driver input impedance;

a driver output impedance different than said driver input impedance;

an initial driver amplifier device having an input impedance that substantially matches said driver input impedance and having an output impedance that substantially matches said driver output impedance; and a final driver amplifier device connected in parallel with said initial driver amplifier device, said final driver amplifier device having an input impedance that substantially matches said driver input impedance and having an output impedance that substantially matches said driver output impedance; and an optical modulator coupled to said driver amplifier assembly, said optical modulator having a modulator input impedance that substantially matches said driver output impedance.

13. An integrated driver/modulator according to claim 12, wherein:

said initial driver amplifier device comprises a first output section;

said final driver amplifier device comprises a second output section;

said optical modulator comprises a modulator transmission line having an impedance that substantially matches said driver output impedance; and said first output section and said second output section are each coupled to said modulator transmission line.

14. An integrated driver/modulator comprising:

a driver amplifier assembly having a driver input impedance and a driver output impedance different than said driver input impedance; and an optical modulator coupled to said driver amplifier assembly, said optical modulator having a modulator input impedance that substantially matches said driver output impedance; wherein said driver input impedance is 50 ohms;

said driver output impedance is less than 50 ohms; and said driver amplifier assembly is configured to accommodate drive signals having a data rate of at least 40 Gb/s.

15. An integrated driver/modulator according to claim 14, wherein:

said driver amplifier assembly comprises a driver input transmission line having an impedance that substantially matches said driver input impedance, a driver output transmission line having an impedance that substantially matches said driver output impedance, and at least one driver amplifier device coupled between said driver input transmission line and said driver output transmission line; and said optical modulator is coupled to said driver output transmission line.

16. An integrated driver/modulator comprising:

a driver amplifier assembly having a driver input impedance and a driver output impedance different than said driver input impedance; and an optical modulator coupled to said driver amplifier assembly, said optical modulator having a modulator input impedance that substantially matches said driver output impedance; wherein said optical modulator comprises a modulator transmission line having an impedance that substantially matches said driver output impedance.

17. An integrated driver/modulator according to claim 16, wherein said driver amplifier assembly comprises a driver amplifier device having an input impedance that substantially matches said driver input impedance and having an output impedance that substantially matches said driver output impedance, said driver amplifier device being coupled to said modulator transmission line.

18. An integrated driver/modulator according to claim 16, wherein said driver amplifier assembly comprises:

an initial driver amplifier device having an input impedance that substantially matches said driver input impedance; and a final driver amplifier device connected in series with said initial driver amplifier device, said final driver amplifier device having an output impedance that substantially matches said driver output impedance; wherein said initial driver amplifier device and said final driver amplifier device are coupled to said modulator transmission line.

19. An integrated driver/modulator comprising:

a driver amplifier assembly comprising a driver input transmission line, a driver output transmission line, and a driver amplifier arrangement coupled to said driver input transmission line and to said driver output transmission line, said driver amplifier arrangement having a driver amplifier input section and a driver amplifier output section; and an optical modulator coupled to said driver amplifier assembly, said optical modulator comprising a modulator transmission line and an optical waveguide; wherein said driver input transmission line and said driver amplifier input section each exhibit substantially the same input impedance;

said driver output transmission line, said driver amplifier output section, and said modulator transmission line each exhibit substantially the same output impedance; and said output impedance is less than said input impedance.

20. An integrated driver/modulator according to claim 19, wherein said input impedance is 50 ohms and said output impedance is 25 ohms.

21. An integrated driver/modulator according to claim 19, wherein:

said driver amplifier assembly comprises an initial driver amplifier device having an input section coupled to said driver input transmission line, and a final driver amplifier device having an output section coupled to said driver output transmission line;

said initial amplifier device has a device input impedance that substantially matches said input impedance; and said final amplifier device has a device output impedance that substantially matches said output impedance.

22. An integrated driver/modulator according to claim 21, wherein:
   said driver amplifier assembly further comprises an intermediate transmission line;
   said initial driver amplifier device has an initial device output section coupled to said intermediate transmission line; and
   said final driver amplifier device has a final device input section coupled to said intermediate transmission line.

23. An integrated driver/modulator according to claim 22, wherein said intermediate transmission line, said initial device output section, and said final device input section each exhibit substantially the same intermediate impedance.

24. An integrated driver/modulator according to claim 23, wherein said input impedance equals said intermediate impedance.

25. An integrated driver/modulator according to claim 23, wherein said intermediate impedance is less than said input impedance.

26. An integrated driver/modulator according to claim 25, wherein said input impedance is 50 ohms.

27. An integrated driver/modulator according to claim 19, wherein said driver amplifier assembly is configured to operate with a bandwidth of at least 30 GHz.

28. An integrated driver/modulator according to claim 19, wherein said driver amplifier assembly is configured to accommodate drive signals having a data rate of up to 40 Gb/s.

29. An integrated driver/modulator according to claim 19, wherein said driver amplifier assembly and said optical modulator are configured for compatibility with OC-192 systems.

30. An integrated driver/modulator according to claim 29, wherein said driver amplifier assembly and said optical modulator are configured for compatibility with OC-768 systems.

31. An integrated driver/modulator according to claim 19, wherein said optical modulator operates with a drive voltage of less than 5 volts.

32. An integrated driver/modulator according to claim 19, further comprising a component package that contains said driver amplifier assembly and said optical modulator.

33. An integrated driver/modulator comprising:
   an optical modulator comprising a modulator transmission line having a modulator transmission line impedance; and
   a driver amplifier assembly comprising a plurality of driver amplifier devices coupled to said modulator transmission line, said driver amplifier assembly having a driver input impedance greater than said modulator transmission line impedance; wherein
   at least one of said driver amplifier devices has a driver output impedance that substantially matches said modulator transmission line impedance.

34. An integrated driver/modulator according to claim 33, wherein said plurality of driver amplifier devices comprises:
   an initial driver amplifier device having an input impedance that substantially matches said driver input impedance; and
   a final driver amplifier device having an output impedance that substantially matches said modulator transmission line impedance.

35. An integrated driver/modulator according to claim 34, wherein said initial driver amplifier device has an output impedance that substantially matches said modulator transmission line impedance.

36. An integrated driver/modulator according to claim 35, wherein said final driver amplifier device has an input impedance that substantially matches said modulator transmission line impedance.

37. An integrated driver/modulator according to claim 35, wherein said final driver amplifier device has an input impedance that substantially matches said driver input impedance.

38. An integrated driver/modulator according to claim 33, wherein said driver input impedance is 50 ohms.

39. An integrated driver/modulator according to claim 33, wherein said driver amplifier assembly is configured to operate with a bandwidth of at least 30 GHz.

40. An integrated driver/modulator according to claim 33, wherein said driver amplifier assembly is configured to accommodate drive signals having a data rate of at least 10 Gb/s.

41. An integrated driver/modulator according to claim 33, wherein said driver amplifier assembly and said optical modulator are configured for compatibility with OC-192 systems.

42. An integrated driver/modulator according to claim 41, wherein said driver amplifier assembly and said optical modulator are configured for compatibility with OC-768 systems.

43. An integrated driver/modulator according to claim 33, wherein said optical modulator operates with a drive voltage of less than 5 volts.

* * * * *